US009650758B2

(12) United States Patent
Plagemann et al.

(10) Patent No.: US 9,650,758 B2
(45) Date of Patent: May 16, 2017

(54) METHOD AND DEVICE FOR BRAKING ROTATING AND/OR SLEWING GEARS

(71) Applicant: Terex Cranes Germany GmbH, Zweibrucken (DE)

(72) Inventors: Joachim Plagemann, Rosenkopf (DE); Heike Schwitzgebel, Homburg (DE); Frank Conrad, Kirkel (DE); Jürgen Schlachter, Dellfeld (DE); Achim Schütz, Dellfeld (DE)

(73) Assignee: TEREX CRANES GERMANY GMBH, Zweibrucken (DE)

( * ) Notice: Subject to any disclaimer, the term of this patent is extended or adjusted under 35 U.S.C. 154(b) by 257 days.

(21) Appl. No.: 14/365,212

(22) PCT Filed: Nov. 9, 2012

(86) PCT No.: PCT/DE2012/001102

§ 371 (c)(1),
(2) Date: Jun. 13, 2014

(87) PCT Pub. No.: WO2013/087048

PCT Pub. Date: Jun. 20, 2013

(65) Prior Publication Data

US 2015/0073667 A1 Mar. 12, 2015

(30) Foreign Application Priority Data

Dec. 15, 2011 (DE) ........................ 10 2011 122 225

(51) Int. Cl.
*E02F 9/12* (2006.01)
*B66C 23/86* (2006.01)
(Continued)

(52) U.S. Cl.
CPC .............. *E02F 9/128* (2013.01); *B66C 23/62* (2013.01); *B66C 23/86* (2013.01)

(58) Field of Classification Search
CPC ........ B60T 13/746; B60T 17/22; B60T 7/042; B60T 7/107; B60T 7/12; B60T 7/20
(Continued)

(56) References Cited

U.S. PATENT DOCUMENTS

2005/0253542 A1* 11/2005 Sugano .................. E02F 9/128 318/371
2006/0076827 A1* 4/2006 Albright .................. B60T 7/20 303/123
(Continued)

FOREIGN PATENT DOCUMENTS

DE 102006040459 A1 3/2007
DE 102008056022 B3 3/2010

OTHER PUBLICATIONS

International Search Report with English translation Dated Feb. 28, 2013; International Application No. PCT/DE2012/001102; 7 pages.

*Primary Examiner* — Redhwan K Mawari
(74) *Attorney, Agent, or Firm* — Cantor Colburn LLP

(57) ABSTRACT

Device and process for braking rotating and/or slewing gears of work machines comprising at least one dynamic service brake for decelerating a rotating and/or pivotal movement of the rotating and/or slewing gear, and at least one static holding brake (16), by means of which the rotating and/or slewing gear can be locked in one position, wherein at least one sensor (14) is assigned to the dynamic service brake (11*a*) and/or to the static holding brake (16), said sensor detecting the current movement of the rotating and/or slewing gear, and the sensor (14) being connected to a controller (13, 19) that detects an actuation of the dynamic service brake (11, 11*a*) said controller actuating the static holding brake (16) when in case of continued rotating and/or pivoting movement of the rotating and/or slewing gear when a dynamic service brake (11*a*) is still actuated.

9 Claims, 3 Drawing Sheets

(51) Int. Cl.
*B66C 23/62* (2006.01)
*G06F 7/70* (2006.01)

(58) Field of Classification Search
USPC ............................................................ 701/50
See application file for complete search history.

(56) References Cited

U.S. PATENT DOCUMENTS

| | | | | |
|---|---|---|---|---|
| 2006/0170284 | A1 * | 8/2006 | Alvarez | B60T 7/122 303/191 |
| 2006/0192424 | A1 * | 8/2006 | Perkins | B60T 1/062 303/11 |
| 2006/0202554 | A1 * | 9/2006 | Hernette | B60T 7/107 303/191 |
| 2007/0068889 | A1 * | 3/2007 | Willim | B66C 23/36 212/299 |
| 2007/0209889 | A1 * | 9/2007 | Echambadi | F16D 65/60 188/196 D |
| 2010/0262330 | A1 * | 10/2010 | Bentner | B60T 7/042 701/31.4 |
| 2010/0304922 | A1 * | 12/2010 | Ohkubo | B60K 6/48 477/4 |
| 2011/0004386 | A1 * | 1/2011 | Kinder | B60T 7/042 701/70 |
| 2011/0089665 | A1 * | 4/2011 | Schneider | B60T 7/104 280/304.1 |
| 2015/0073667 | A1 * | 3/2015 | Plagemann | B66C 23/86 701/50 |

* cited by examiner

METHOD AND DEVICE FOR BRAKING ROTATING AND/OR SLEWING GEARS

CROSS REFERENCE TO RELATED APPLICATION

This application claims the benefit of PCT/DE2012/001102, filed Nov. 9, 2012, which claims the benefit of DE 102011122225.5, filed Dec. 15, 2011, the contents of which are incorporated herein by reference thereto.

FIELD OF THE INVENTION

The present invention relates to a device for braking rotating and/or slewing gears of work machines comprising at least one dynamic service brake for braking a rotating and/or pivotal movement of the rotating and/or slewing gear, and at least one static holding brake, by means of which the rotating and/or slewing gear can be locked in one position.

BACKGROUND

In order to decelerate rotating and/or slewing gears in construction machines, as is generally known, at least one dynamic brake and one static holding brake are used. With the dynamic brake, the rotational motion of the rotating gear, which is for example connected to a revolving superstructure of a mobile crane, can be decelerated in a controlled manner. With the holding brake, the rotating gear is locked at standstill.

When the dynamic service brake is actuated (for example via a brake pedal or a control lever or the like), a signal is generated that is evaluated by a controller. Taking into account additional parameters, such as rotational speed, load condition and/or load distribution, the controller controls the actuating elements, such as, for example, the hydraulic pumps and hydraulic valves, in order to decelerate the rotating gear. After the rotating gear has been brought to a standstill, it can be held in its current position by the connecting an additional static holding brake.

These types of arrangements and braking techniques have proven effective, however, they have the disadvantage that if the dynamic brake fails, there may not be a possibility of carrying out regulated emergency braking of the rotating and/or slewing gear, and in that way enabling a controlled deceleration of the revolving superstructure and/or of a boom. Because if the static holding brake is additionally connected, for example during the rotational movement of the rotating gear, this may lead to an abrupt stop of the rotating gear, and thus to a halt of the rotational movement of the revolving superstructure connected to the rotating gear.

Generally used as holding brakes are multiple-disk brakes that are comprised of a plurality of disks positioned consecutively on an axis, and which are non-rotatably connected to the fixed, or as the case may be, to the rotating part of the construction machine. These types of brakes have proven effective, however, they have the disadvantage that in the event of an abrupt stop of the rotating or slewing gear, the components of the construction machine itself can be seriously damaged, or, for example, uncontrolled swinging of the load attached to the boom can occur.

It has been shown that, given the design of the holding brake, safe braking of the rotating and/or slewing gear using the holding brake may not be possible. In an emergency, for example if the dynamic brake fails, the static holding brake can additionally be engaged during the rotating, or as the case may be, pivoting movement. This results in an abrupt interruption of the rotating or pivoting movement. This leads to shocks, and thus to increased wear on the rotating and/or slewing gear, and in the worst case, to the construction machine being destroyed.

It is therefore an object of the present invention to provide a device that overcomes the disadvantages described above, it then being possible, using said device, to ensure, even under operational conditions, safe and rapid braking of rotating and/or slewing gears in any installed configuration of a work machine. Another object is to provide a device which will, in the event of failure of the dynamic brake, ensure safe braking of rotating and/or slewing gears.

SUMMARY

This object may be achieved by assigning at least one sensor, which detects the current movement of the rotating and/or slewing gear, to the dynamic service brake and/or to the static holding brake, said sensor being connected to a controller that detects the actuation of the dynamic service brake and actuates the static holding brake in case of a continued rotating and/or pivoting movement of the rotating and/or slewing gear if the dynamic service brake is still operating.

Inventively, the static holding brake is designed as actuated in a clocked manner using the controller. Due to the clocked actuation of the static holding brake, the kinetic energy of the rotating and/or slewing gear can be gradually diminished, thus preventing that components of the work machine are damaged. This means that there is no increase in the braking distance compared to braking with the dynamic service brake. In this way, the static holding brake can serve as a genuine alternative to braking rotating and/or slewing gears using the dynamic service brake, and in an emergency, for example in the event of a failure of the dynamic service brake, the static holding brake can assume the dynamic service brake's functions without restrictions. The clock rate can be designed as fixed or variable, for example, dependent on the rotational speed, the mass moment of inertia, the overall machine configuration, etc., and is preferably determined experimentally, depending on the type of work machine.

In another advantageous embodiment of the inventive device it is provided that the static holding brake can be actuated via the controller. It is further provided that the static holding brake can be actuated in a regulated manner via the controller.

After standstill of the rotating and/or slewing gear, which can also include falling below a definable minimum speed of rotation, provision is made for permanently locking the static holding brake as long as the dynamic service brake remains engaged.

It is inventively provided that the sensor for detecting the rotational and/or slewing movement of the rotating and/or slewing gear is designed as an rpm sensor and/or a hydraulic flow-rate sensor. Depending on the respective application, cancelling the actuation of the dynamic brake during braking with the static holding brake can result in an interruption in the latter. Furthermore, safe braking is also possible in case of an improper operation of the static holding brake, for example during a rotational and/or pivotal movement of the rotating and/or slewing gear.

According to another advantageous embodiment, it is provided that the sensor is designed as acceleration sensors in order to detect the rotational and/or slewing movement. Such a sensor measures the change in the speed of the rotating and/or slewing gear and could be assigned—independently of the vehicle's hydraulic system—, as a purely electronic and/or electromechanical system unit, to the work machine.

Furthermore, an object of the present invention is to provide a method of controlling a device by:

a) using the static holding brake for regulated braking of rotating and/or slewing gears of work machines,
b) detecting a rotational and/or slewing movement of the rotating and/or slewing gear by means of a sensor,
c) starting a clocked actuation of the static holding brake for the rotating and/or slewing gear in case of a continued actuation of the dynamic service brake and continued rotational and/or pivoting movement by means of a controller connected to the sensor during the rotation and/or pivoting process,
d) actuating the static holding brake via a brake pedal and/or control lever assigned to the work machine,
e) actuating the static holding brake, dependent on the speed of rotation, via the controller, and
f) evaluating the brake-pedal position and/or the control-lever position for actuating the static holding brake and permanent application of the static holding brake in case of a complete standstill of the rotating and/or slewing gear, or if the speed of the rotating gear falls below a minimum speed of rotation of 0.01 to 0.2 revolutions/min.

Another object of the present invention is to disclose a work machine, wherein the work machine can be designed as a mobile crane or a revolving platform.

BRIEF DESCRIPTION OF THE DRAWINGS

The invention will be described below on the basis of exemplary drawings with reference to the attached drawings. They show.

DETAILED DESCRIPTION

Figure 1:
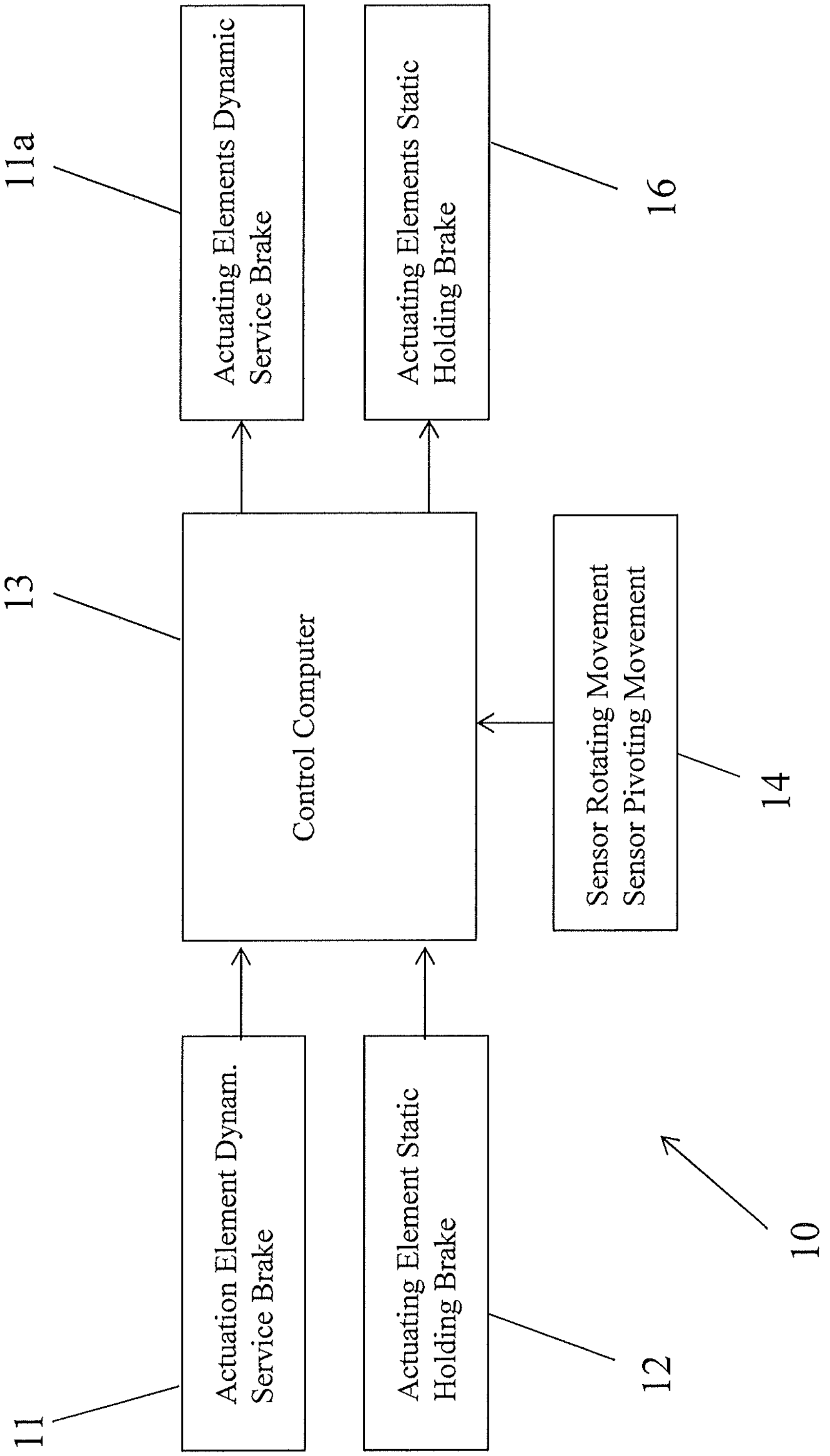
FIG. 1 a block diagram of the control system.

FIG. 1 shows the inventive device 10 and its actuating elements for a dynamic service brake 11 and the actuating elements 11*a* associated therewith, as well as a static holding brake 12 and the actuating elements 16 associated therewith, the signals of said actuating elements being registered by a controller that is designed here as a control computer 13. In addition, the control computer 13 registers, via a sensor 14, whether a rotational movement of a rotating and/or slewing gear (neither of which is shown) is carried out or not. In so doing, the control computer 13 evaluates the signals recorded by the sensor 14, possibly taking into account additional parameters, such as, for example, mass moments of inertia. If, when the dynamic service brake 11 is actuated, the rotating and/or slewing gear of the work machine (neither of which is shown) do not, as intended, come to a standstill, emergency braking is started. For this purpose, actuating elements of the static holding brake 16 are actuated by the control computer 13. In so doing, the actuating elements of the static holding brake 16 are actuated such that the holding brake engages and disengages at a specified clock rate until the rotating and/or slewing gear comes to a standstill.

As soon as the sensor 14 reports the standstill of the rotating and/or slewing gear to the control computer 13, the latter permanently engages the static holding brake via the actuating elements. Only when the actuating element for the dynamic service brake 11 is reset by a user do the actuating elements of the static holding brake 16 reopen. Here, it is provided that the static holding brake for the rotating and/or slewing gear can be reengaged by the user via the corresponding actuation element for the static holding brake 12.

Figure 2:
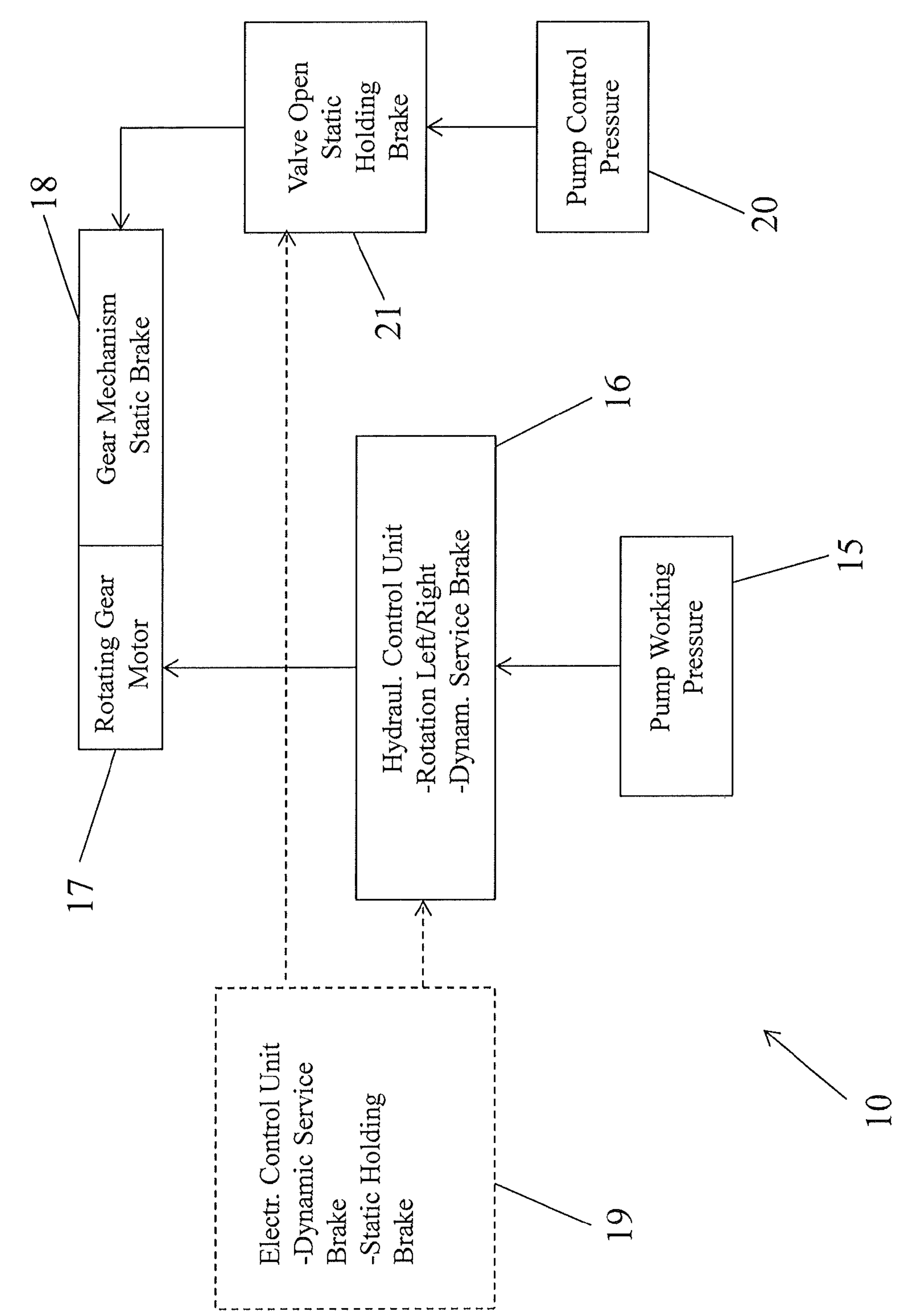
FIG. 2 a block diagram of the hydraulic system for an open circuit.

FIG. 2 is a schematic representation of the hydraulic system of the inventive device in an open circuit for rotating the rotating gear of a work machine. Here, a pump 15 conveys hydraulic oil to a slewing gear motor 17 via an hydraulic control unit 15, said slewing gear motor 17 being driven thereby, and rotating a revolving superstructure of a work machine (not shown) via a gear mechanism 18. The hydraulic control unit 16 is actuated by an electric control unit 19 and determines the direction of rotation and the speed of rotation. During the rotational movement, the static holding brake in the gear mechanism 18 is kept open by connecting a control pressure from a pump 20 via a valve 21.

A dynamic braking operation is started via the electric control unit 19, and the slewing gear motor 17 is decelerated by the hydraulic control unit 16. If the dynamic brake fails, this is detected by the electric control unit 19 by evaluating the information from the sensor 14 (in FIG. 1). As a result, an emergency braking operation is started by means of the valve 21. The electric control unit 19 switches the valve 21 on or off at a specified clock rate, so that the static holding brake in the brake mechanism 18 opens and closes at this clock rate. In this way, the revolving superstructure of a work machine is decelerated in a regulated and controlled manner.

Figure 3:
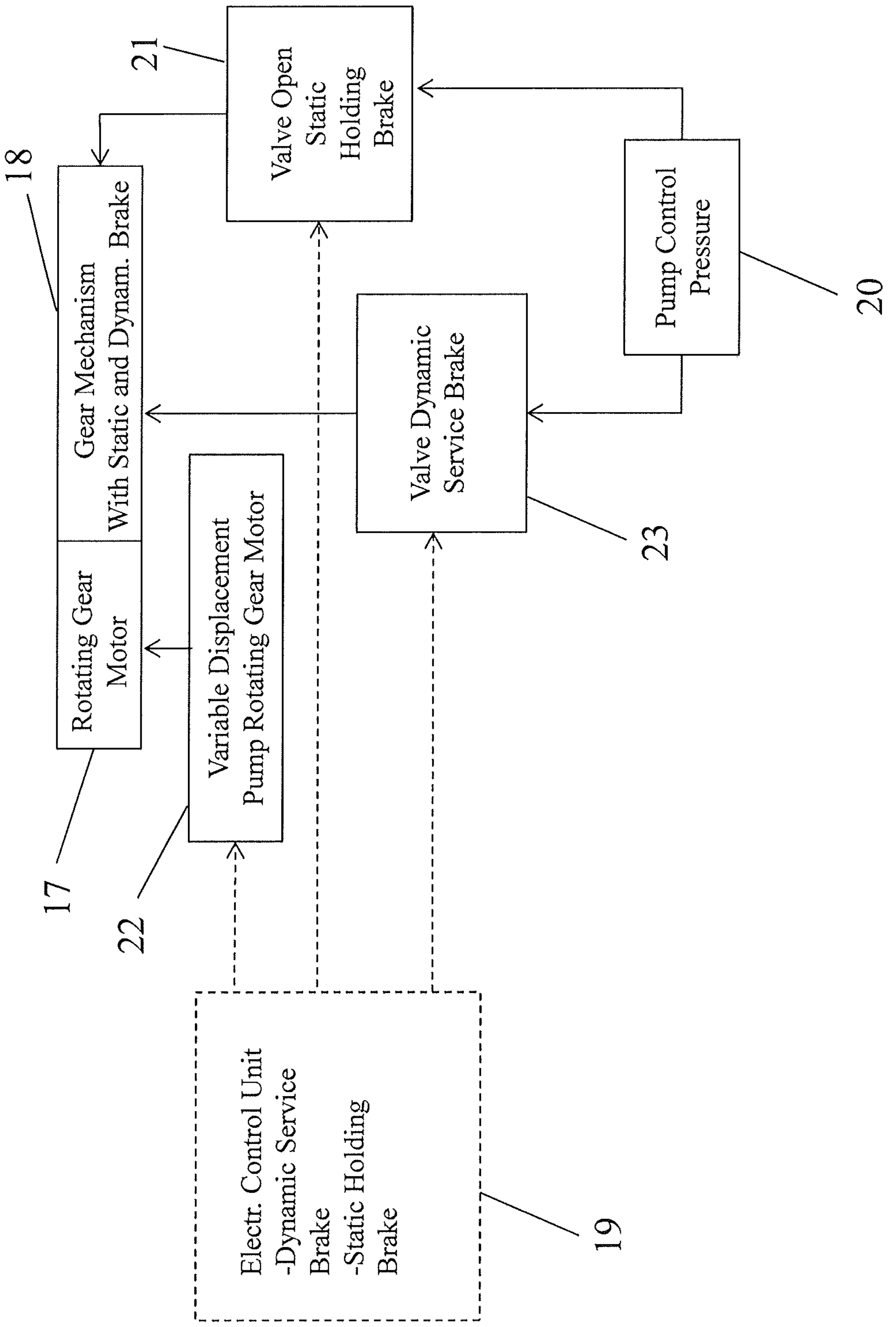
FIG. 3 a block diagram of the hydraulic system for a closed circuit.

FIG. 3 is the representation of a block diagram of the hydraulic system of the inventive device 10 in a closed circuit.

In this case, a variable displacement pump 22 for a rotating gear conveys hydraulic oil to the slewing gear motor 17. The slewing gear motor 17 is driven in this way, and thereby also the gear mechanism 18 that is operatively connected to the slewing gear motor 17. The gear mechanism 18 in turn establishes the positive locking with the revolving superstructure of the work machine and ultimately drives said revolving superstructure. The variable displacement pump 22 is actuated via the electric control unit 19 and defines the direction of rotation and the speed of rotation. In this configuration, a static holding brake and a dynamic service brake are assigned to the gear mechanism 18. Each can be actuated independently of the other. During a rotational or pivoting movement, the static holding brake in the gear mechanism 18 is kept disengaged by connecting the control pressure of the pump 20 via the valve 21. A dynamic braking operation is started by the electric control unit 19 via a valve 23 for the dynamic service brake. The pump 20 thereby supplies the valve 23 with the required control pressure.

A failure of the dynamic braking system is detected by the electric control unit 19 by evaluating the sensor 14 (in FIG. 1). As a result, emergency braking is started via the valve 21. The electric control unit 19 switches the valve 21 on and off at a specified clock rate, so that the static holding brake in the gear mechanism 18 opens and closes at this clock rate, and the revolving superstructure can in that way be decelerated in a regulated and controlled way.

What is claimed is:

1. Mobile crane having a revolving superstructure and rotating gears for said revolving superstructure and comprising at least one dynamic service brake designed for decelerating a rotating movement of the rotating gear and at least one static holding brake designed for locking the rotating gear being in a standstill in one position, by means of which the rotating and/or slewing gear is configured to be locked in one position, wherein at least one sensor (14) is assigned to the dynamic service brake and/or to the static holding brake (11*a*, 16), said sensor detecting the current movement of the rotating and/or slewing gear, and said sensor (14) being connected to a controller (13, 19) that detects the actuation of the dynamic service brake (11, 11*a*) and that, in case of a failure of said dynamic service brake (11*a*) being detected by a continued rotating movement of the rotating gear although the dynamic service brake (11*a*) is continually actuated said controller actuates the static holding brake (16), wherein the static holding brake (16) is regulated at a specified clock rate via the controller (13,19) for decelerating the rotating movement of the rotating gear to a standstill.

2. The device according to claim 1, wherein the sensor (14) for detecting the rotating and/or pivoting movement of the rotating and/or slewing gear is designed as a rotational speed sensor or a hydraulic flow-rate sensor.

3. The device according to claim 1, wherein the clock rate of the static holding brake (16) actuated by the controller (13, 19) is designed fixed or variable.

4. The device according to claim 1, wherein static holding brake (16) remains permanently closed after standstill of the rotating and/or of the slewing gear as long as the dynamic service brake (11*a*) is still in operation.

5. The device according to claim 1, wherein when a minimum rotational speed of the rotating and/or slewing gear is fallen short of, the static holding brake (16) remains permanently applied as long as the dynamic service brake (11*a*) remains in operation.

6. A method of controlling a mobile crane having a revolving superstructure and rotating gears for said revolving superstructure, the method comprising the process steps of:

a) utilizing a static holding brake (16) designed for locking the rotating gear being in a standstill in one position for regulated braking of rotating gears of mobile cranes having a revolving superstructure and rotating gears for said revolving superstructure, b) detecting a rotating movement of the rotating gears by means of a sensor (14), c) starting of a clocked actuation of the static holding brake (14) for the rotating gear in case of a failure of a dynamic service brake (11*a*) designed for decelerating a rotating movement of the rotating gears of mobile cranes having a revolving superstructure and rotating gears for said revolving superstructure being detected by a continued actuation of a dynamic service brake (11*a*) together with a continued rotating movement of the rotating gears by means of a controller (13, 19) connected to the sensor (14) during the rotating process, d) actuating the static holding brake (16) via a brake pedal and/or control lever assigned to the mobile crane having a revolving superstructure and rotating gears for said revolving superstructure, e) actuating the static holding brake (16) via the controller (13, 19), wherein actuating the static holding brake (16) is rotational speed dependent, f) evaluating the brake pedal position and/or control lever position for the actuation of the static holding brake (16) and permanent application of the static holding brake (16) in case of a complete standstill of the rotating gear or when the speed of the rotating gear falls below a minimum rotational speed of 0.01 to 0.2 revolutions/minute.

7. A work machine having a device according to one of claim 1, 2, 3, 4, 5, or 6, wherein the work machine is a work machine with a revolving superstructure.

8. The work machine according to claim 7, wherein the work machine is a mobile crane.

9. The work machine according to claim 7, wherein the work machine is a revolving platform.

* * * * *